May 19, 1953 E. P. OLSON 2,639,070
SEPARATING AND PACKAGING OF BOOK MATCHES
Filed April 28, 1949 11 Sheets-Sheet 1

Fig.1.

Inventor:
Eric P. Olson
by his Attorneys,
Flock and Simon

May 19, 1953      E. P. OLSON      2,639,070
SEPARATING AND PACKAGING OF BOOK MATCHES
Filed April 28, 1949      11 Sheets-Sheet 4

Inventor:
Eric P. Olson
by his Attorneys,
Flocks and Simon

May 19, 1953 — E. P. OLSON — 2,639,070
SEPARATING AND PACKAGING OF BOOK MATCHES
Filed April 28, 1949 — 11 Sheets-Sheet 10

Inventor:
Eric P. Olson
by his Attorneys,
Flocke and Simon

May 19, 1953 E. P. OLSON 2,639,070
SEPARATING AND PACKAGING OF BOOK MATCHES
Filed April 28, 1949 11 Sheets-Sheet 11

Inventor:
Eric P. Olson
by his Attorneys
Flocks and Simon

Patented May 19, 1953

2,639,070

UNITED STATES PATENT OFFICE 2,639,070

SEPARATING AND PACKAGING OF BOOK MATCHES

Eric P. Olson, Oswego, N. Y., assignor to The Diamond Match Company, New York, N. Y., a corporation of Delaware Application April 28, 1949, Serial No. 90,163

19 Claims. (Cl. 226—4)

The present invention relates to the separation and packaging of book matches. More particularly the present invention relates to a novel machine and process for the separation and segregation of a substantially continuous supply of book matches into groups and for the packaging of these groups in a suitable carton therefor.

In United States Patent No. 2,222,026 to Ray H. Gill, issued November 19, 1940, there is disclosed a mechanism for assembling match packets or books. The books as fed from a cover tucking mechanism of the type disclosed in United States Patent No. 2,195,197 to C. F. Wright, issued March 26, 1940, are received in a turret provided with a peripheral series of radial pockets, and as the turret is rotated the books are rotated so that the thick portion of each alternate book is assembled in face-to-face relation with the thin portion of the other books and thereafter discharged to receiving trough or table in the form of two rows of books. As may be understood, this rotation of the books is essential to enable the books to be satisfactorily packaged.

Prior to the instant invention, the books were manually selected from the receiving trough by an operator who removed from the row of books approximately twenty-five books from each row and placed the books into an open carton. Thereafter the operator placed a suitable cover on the carton. It was a difficult operation to grasp twenty-five match books in one hand while holding a carton in the other and proper loading of the match books in the cartons, therefore, involved a considerable degree of skill. Further, the speed of the apparatus prior to the loading operation was determined by the speed and skill of the loading operator and it was impossible, at best, to operate the apparatus at its optimum speed.

It is a general object of the present invention, therefore, to provide a novel apparatus and method for the separation and segregation of a predetermined number of match books as these books are fed from a reversing mechanism.

A second general object of the present invention is to provide a novel apparatus which will cooperate with the reversing mechanism to project separating pins or fingers between selected books of a series in order to separate the books into predetermined groups.

A third object of the present invention is to provide a novel apparatus for segregating groups of match books and maintain the same under compression while conveying the aforesaid books past a first station so that an inverted carton can be placed over the books. Thereafter the books, in accordance with the present invention, after loading into the cartons, are turned over or reversed by suitable means at a second station and thereafter returned to a position adjacent the first station to enable the cover to be placed on the carton.

Other objects and the nature and advantages of the instant invention will be apparent from the following description taken in conjunction with the accompanying drawings, wherein:

Fig. 3 is a plan view of the mechanism shown in Fig. 1;

Figure 1:
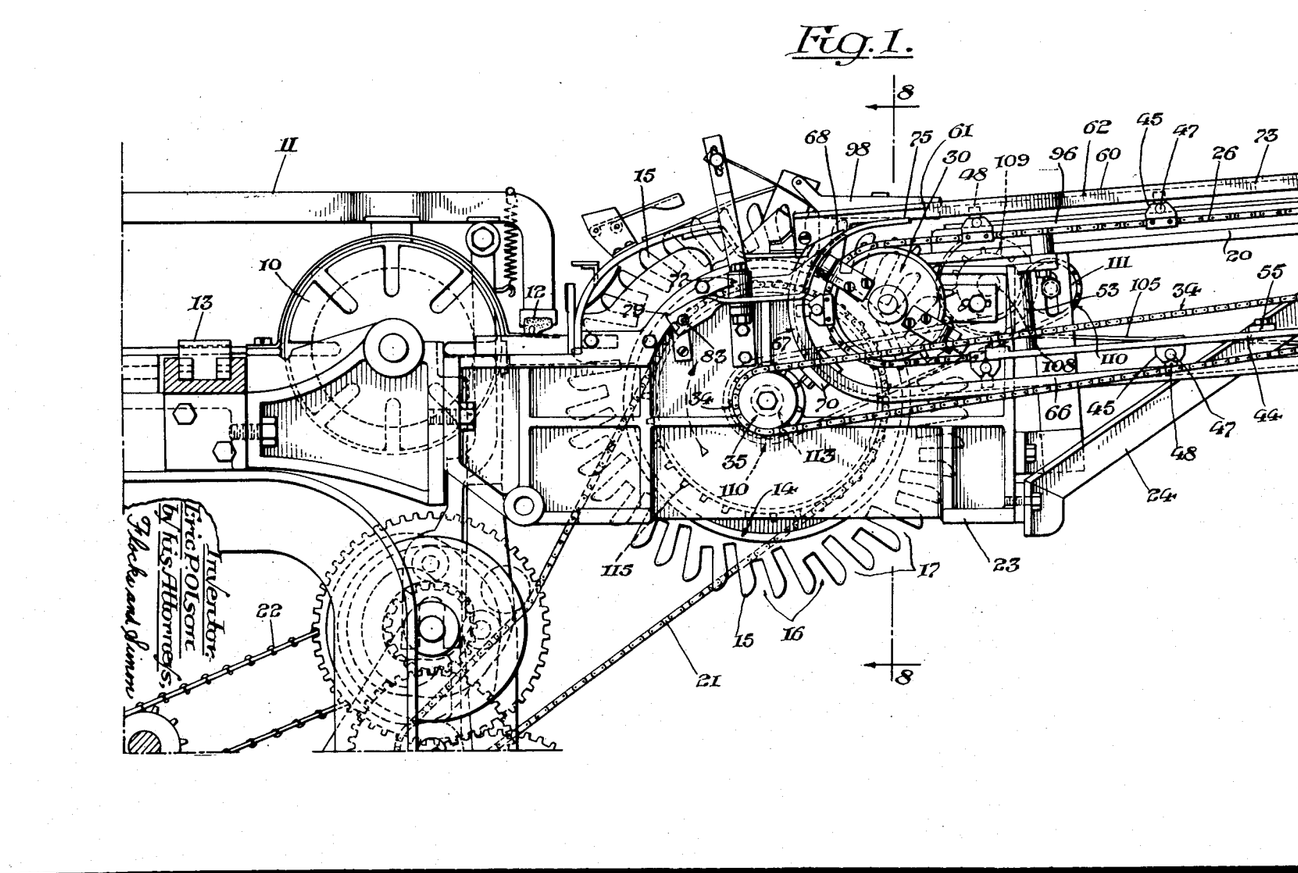
Fig. 1 is a side elevation of the delivery end of a book match machine including a reversing turret for delivering book matches to mechanism embodying my invention.
Figure 7:
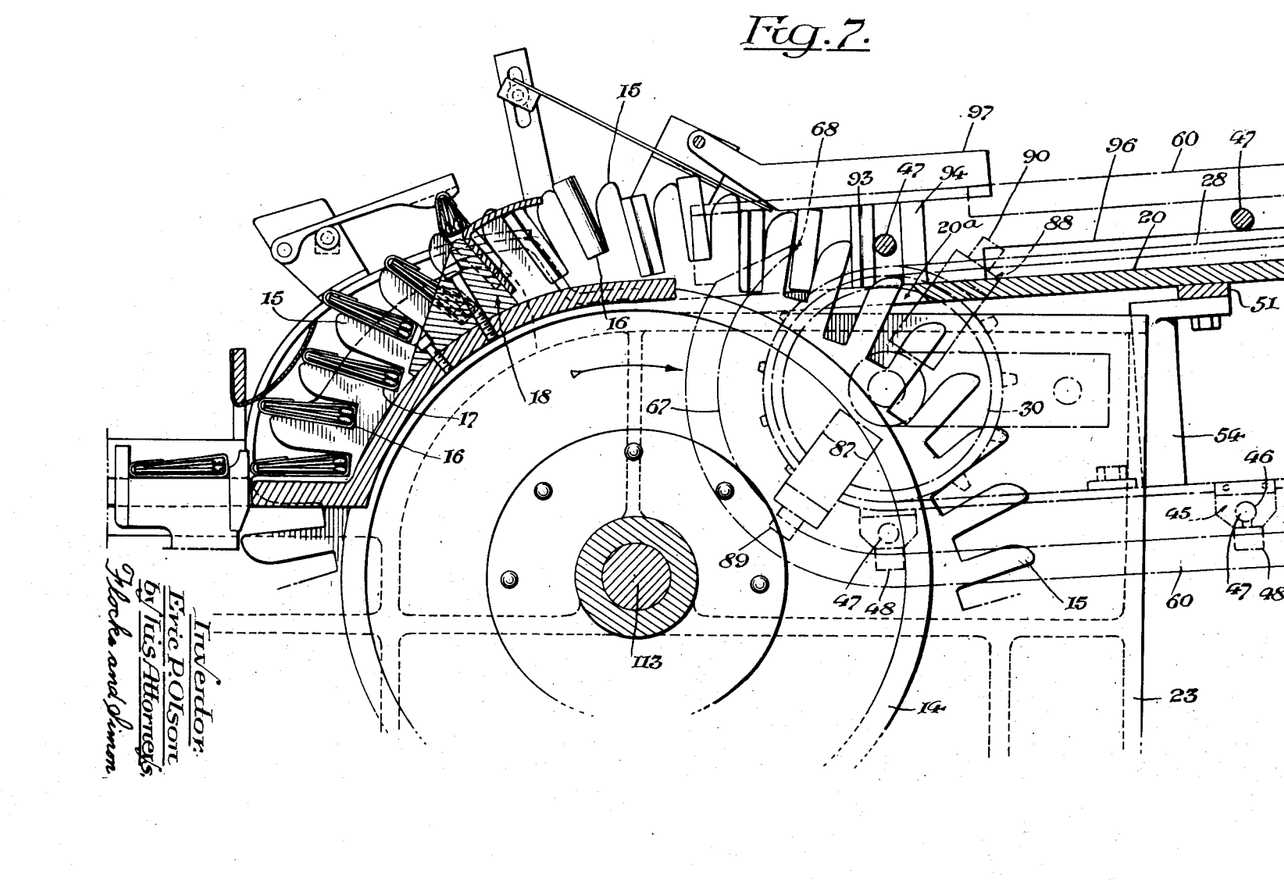
Fig. 7 is a longitudinal vertical section of the match book reversing mechanism and also showing the relative position of the book match trough and spacing pins forming a part of this invention.
Figure 8:
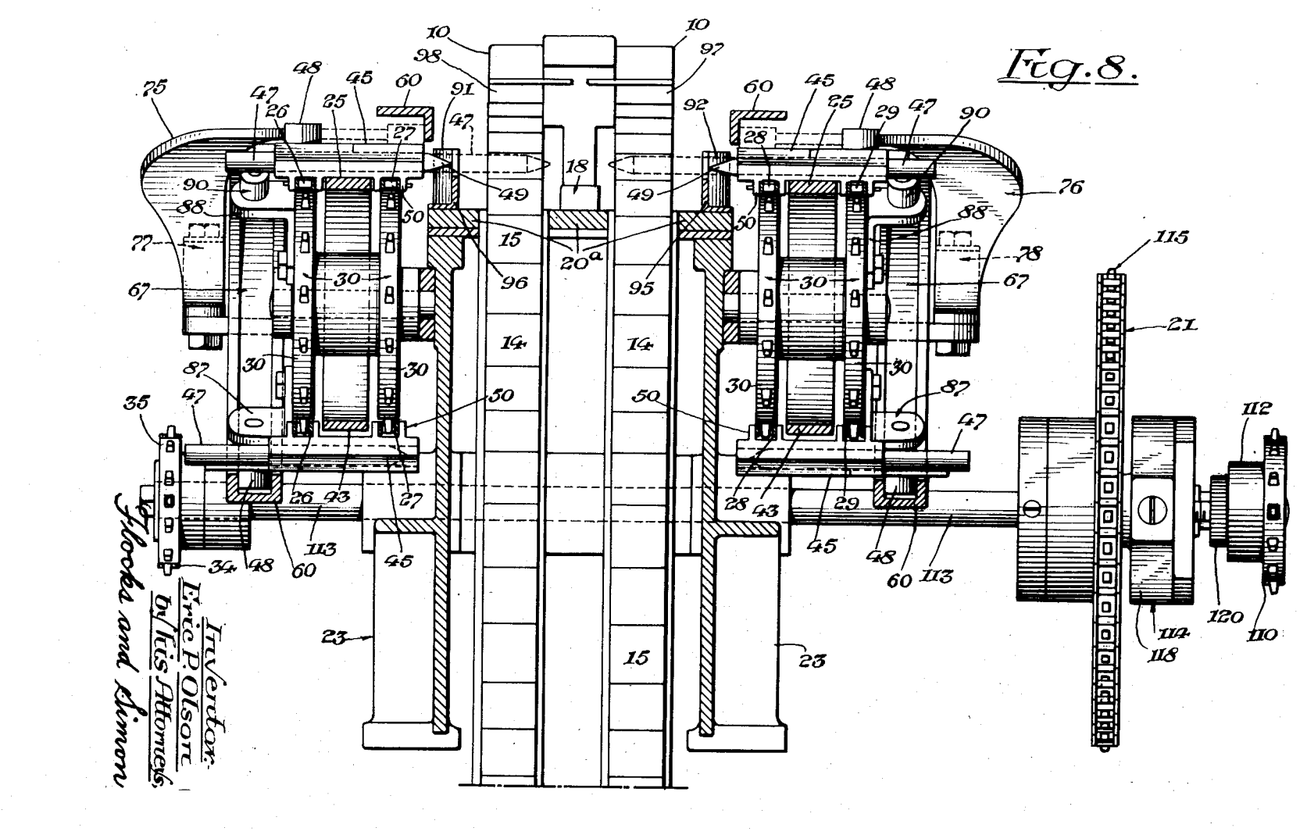
Fig. 8 is a vertical section of the machine, as on the line 8—8 of Fig. 1, showing the spacing pins and their supports and also showing the guideways for projecting or retracting such pins.
Figure 9:
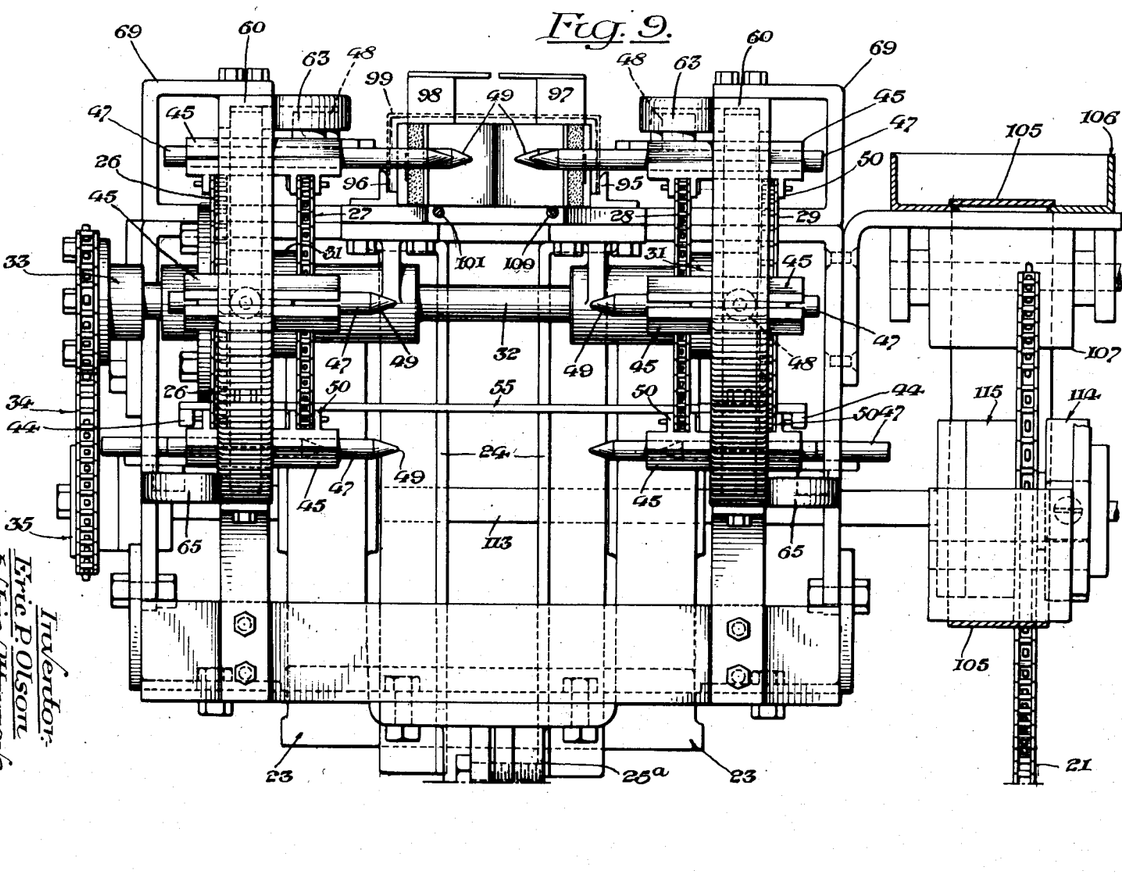
Fig. 9 is a sectional view, as on the line 9—9 of Fig. 2, showing the mechanism in end elevation and the adjacent belt and trough in section.

Referring to the figures of the drawings and particularly to Fig. 1, an intermittently rotatable turret or wheel of a flap tucking mechanism is indicated at 10. Cooperating with the turret 10 is a tucker arm 11 which is provided with a friction head 12 serving to tuck the free ends of cover flaps of match books under the retaining folds thereof as more completely shown and described in the United States patent to C. F. Wright No. 2,195,197, dated March 26, 1940. As disclosed in the Wright patent the mechanism there shown is adapted to receive match books from a match-booking machine of the type shown, for example, in United States Patent No. 1,042,472 to Paridon et al., dated October 29, 1912, a conveyor chain conveying the finished books from a machine similar to that shown in the aforesaid Paridon patent, being indicated in Figure 1 of the instant application at 13. From the tucking mechanism which feeds the assembled match books in two rows, the books are fed into the pockets formed in two similar wheels 14—14 of a reversing mechanism, each of the wheels 14—14 being provided with radial pockets separated by teeth indicated at 15. As shown, the aforesaid pockets are of different depth, each alternate pocket being relatively shallow and each other alternate pocket being of correspondingly greater depth. The shallow pockets are indicated at 16 and the deep pockets by the reference numeral 17. As best shown in Fig. 7, mounted between the wheels 14, is a suitable cam 18 which serves to lift one of the edges of match books in the shallow pocket 16 as they pass the cam so as to rotate these books within the shallow pockets 90°. Another mechanism, not shown in detail, is also provided for moving the books within the deep pocket 17 in a reverse direction 90° so that as the books travel from the point indicated at 19 their discharge at the trough 20, they are then positioned in face-to-face relationship with each alternate book in reverse arrangement. As previously set forth, the reversing mechanism shown in the present drawings is of the type more fully disclosed in the Gill Patent No. 2,222,026. Both the reversing mechanism just described and the tucking mechanism are, as may be understood from the drawings, driven in synchronism by the sprocket chains 21 and 22.

The separating and segregating mechanism of the present invention is supported from the frame structure 23 of the reversing mechanism, diagonal supporting arms, such as the arm 24 serving to support a portion of the guide tracks 25, and the right-hand end of the machine being supported by a supplemental standard 25a.

Each side of the machine of the present invention includes a pair of guide and driving chains indicated at 26, 27, 28 and 29, respectively. The chains are trained over sprockets at each of their ends, the left-hand end of the chains being trained over sprockets such as that indicated at 30, and the right-hand end of the chains being trained over drive sprockets 31. The sprockets 31 rotate with shaft 32 driven by sprocket 33. The sprocket 33 is driven by the chain 34 which is driven by a sprocket 35 rotatable with the shaft 113 of the reversing mechanism.

Figures 4, 5, 6:
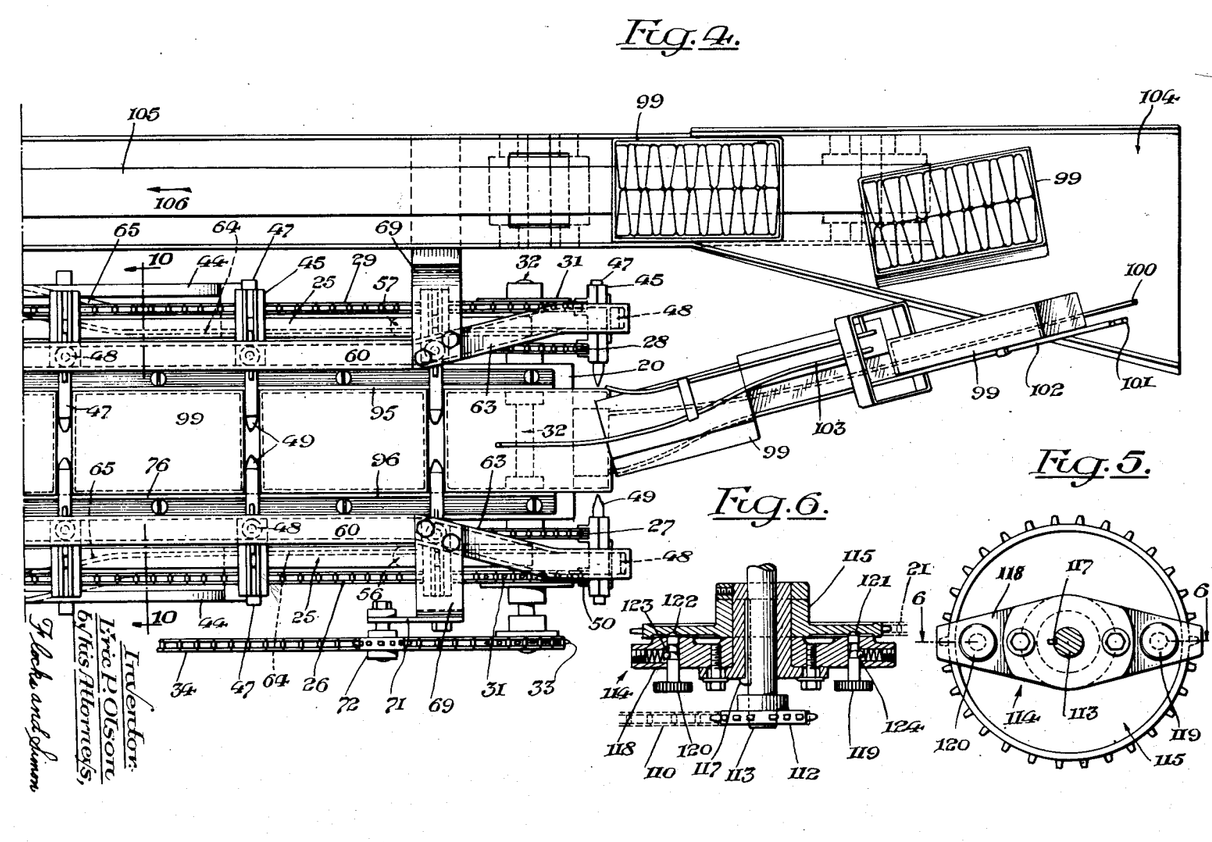
Fig. 4 is a similar view showing the opposite end of Fig. 3.
Fig. 5 is a sectional view taken on the line 5—5 of Fig. 3 showing the safety clutch in elevation.
Fig. 6 is a horizontal section, as on the line 6—6 of Fig. 5.
Figure 5:
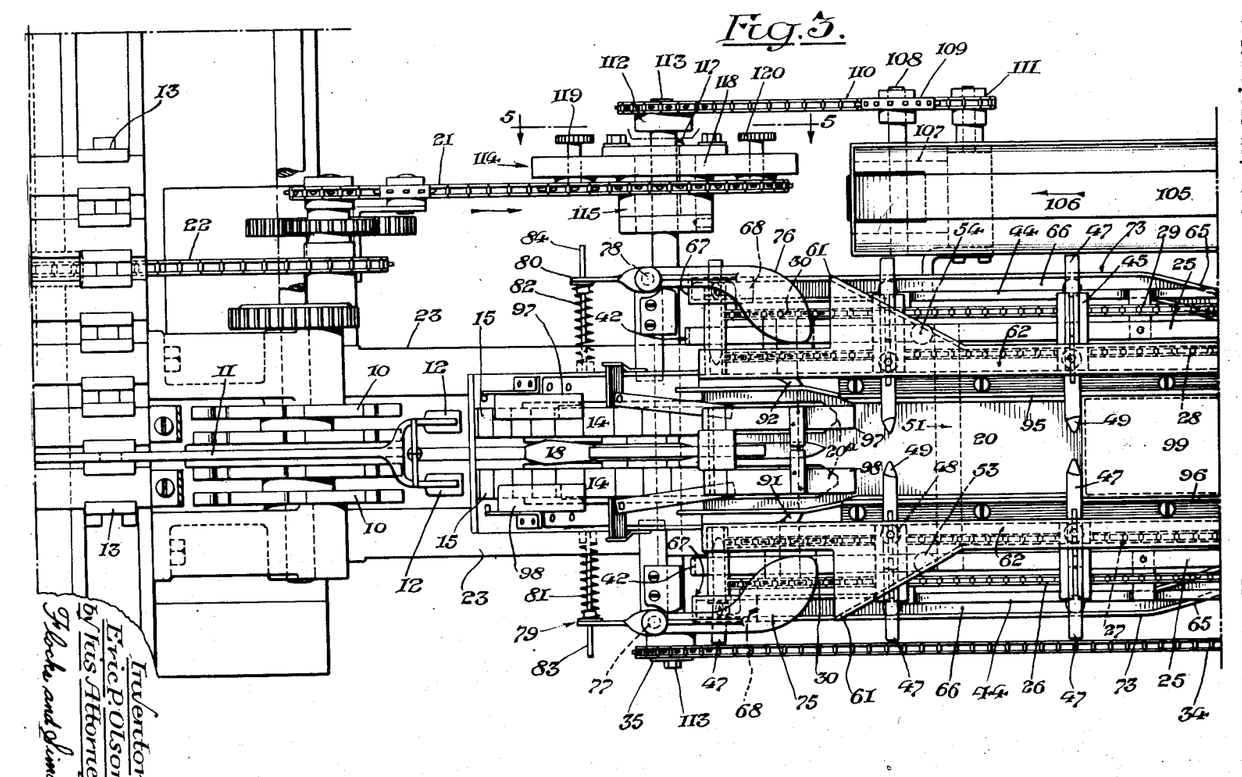

As best shown in Fig. 4, the shaft 32 extends transversely across the machine and drives all of the corresponding sprockets 31 for the chains 26, 27, 28 and 29.

Figures 12, 13, 14:
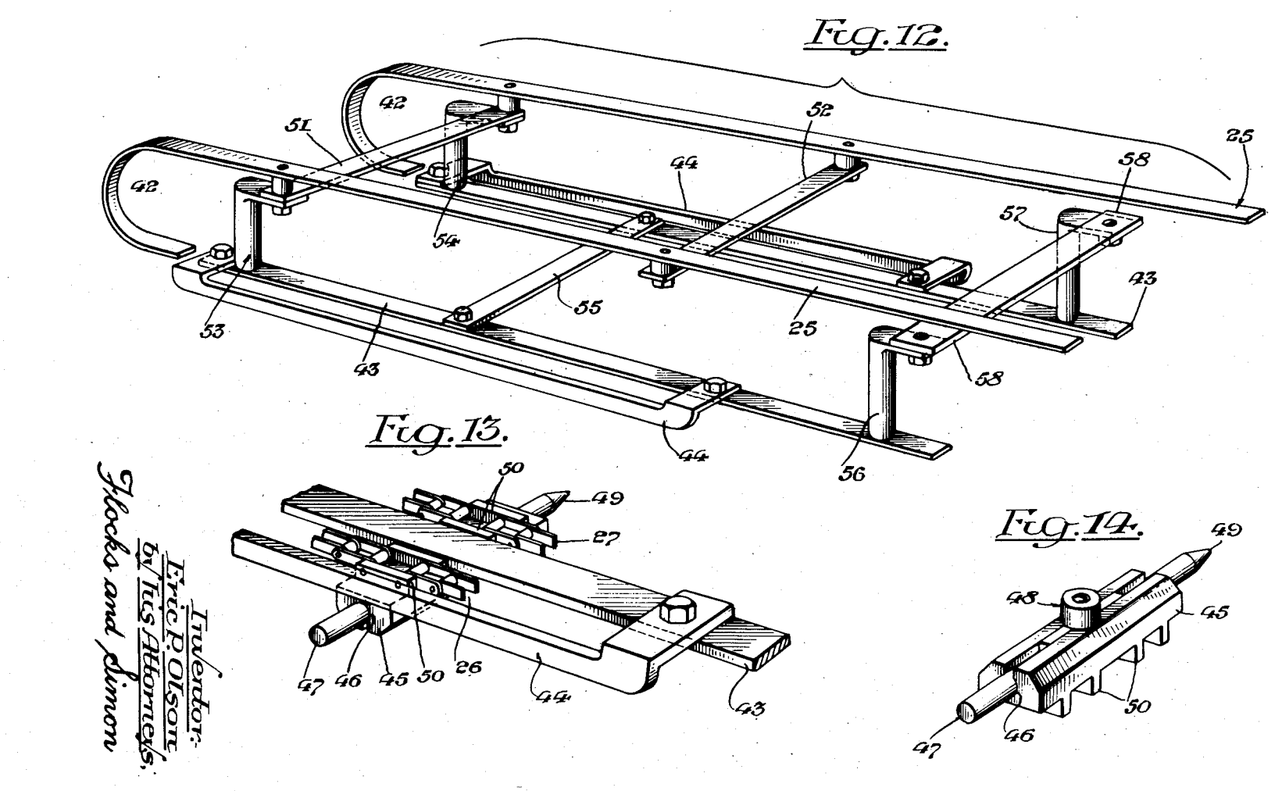
Fig. 12 is a perspective view of the frame arrangement for supporting and guiding the carrier chain.
Fig. 13 is a similar view showing the bottom guide frame in relation to the chain.
Fig. 14 is a perspective view of the book match spacer pin and its support, the pin and support being shown in inverted position as compared to Fig. 13.

Suitably supported on the machine frame is a track system which includes the upper rails 25, previously referred to, which are provided at the left-hand end of the machine, with curved portions 42 and the lower rails 43 provided with suitable lateral guide members 44. The rail system is best shown in Fig. 12. Guided by the rails, are a plurality of sheaths 45, shown in detail in Figs. 13 and 14. Each sheath 45 is provided with a bore 46 adapted to slidably receive a pin 47 having a roller 48 projecting from the upper side thereof and with a pointed end 49. Sheaths 45 are also provided with lugs 50 projecting from their lower face. The lugs 50 are of a length to span the distance of a link in the chains 26, 27, 28 and 29, and, as shown in Fig. 13, are assembled with the chains so as to move therewith.

Figure 10:
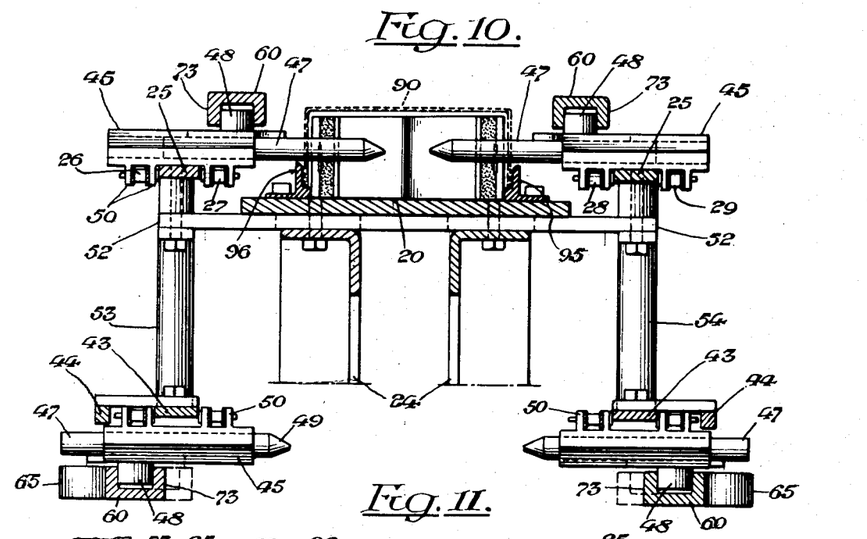
Fig. 10 is a transverse section, as on the line 10—10 of Fig. 4, showing the spacing pins and supports therefor.
Figure 11:
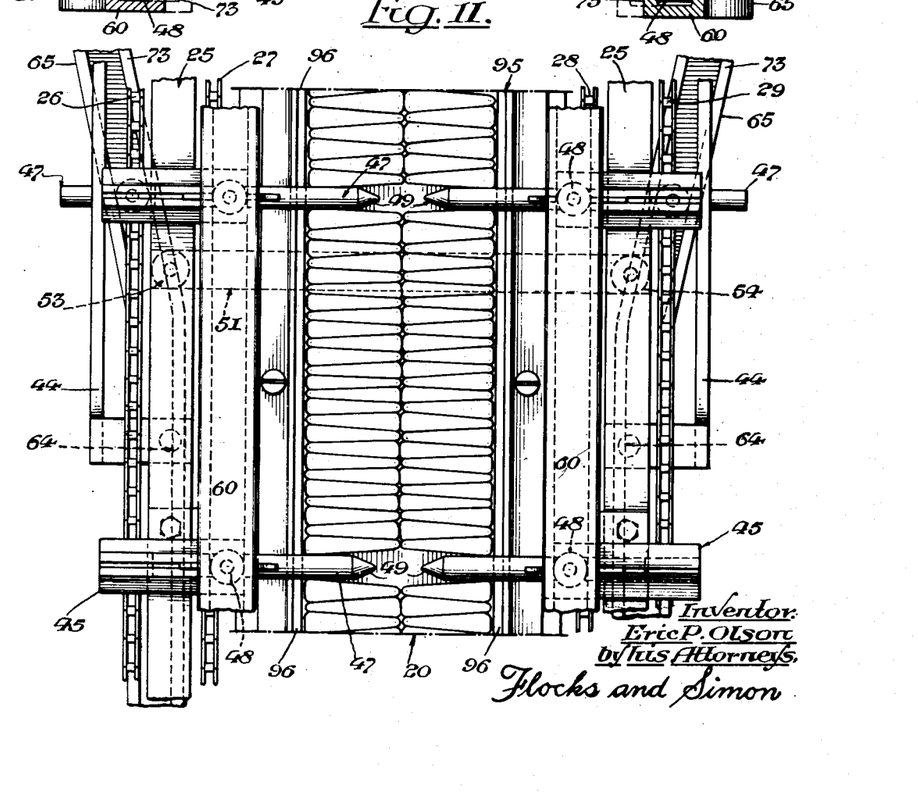
Fig. 11 is a plan view of a portion of the book match trough showing the books therein separated into groups of fifty prior to placing a carton bottom side up on the separated match books.

The rails 25 are connected and braced by the cross members 51 and 52 and the lower rails 43 are connected at one end of the cross member 51 by the posts 53 and 54. The rails 43 are further spaced and supported by the cross member 55 and by the posts 56 and 57 connected by the cross member 58. In addition to the rails which serve to guide the sheaths 45 as they are carried by the conveyor chains, the rollers 48 carried by the pins 49 are guided through the greater part of their movement by the guide tracks 60 which run generally parallel to the path of the conveyor chains, one of the guide tracks being positioned on each side of the machine. As best shown in Figs. 3 and 4 the guide tracks 60 are each provided with outwardly extending portions 61 which serve to guide the rollers 48 into the portions 62 which extend in close proximity to the trough 20. At a point adjacent the discharge end of the trough 20 the guide tracks 60 are provided with outwardly extending portions as indicated at 63 and are then turned downwardly to follow the path of the conveyor chains about their sprockets. The guide tracks 60 are also provided with return portions 64 and with second outwardly extending portions 65 and with portions 66 paralleling the guide chains. A pair of upwardly turned portions are also provided as indicated at 67. As best shown in Fig. 3, the guide tracks 60 terminate at the points indicated at 68. The guide tracks 60 are suitably supported as by the hangers 69 at one end and by the hangers 70 at their other end. One of the hangers 69 is also provided with an arm 71 which serves to support an idler sprocket 72 for the drive chain 34. The guide tracks 60 are each provided with vertically disposed integral flanges 73 extending downwardly within the upper portion of the track and upwardly extending within the lower or return portion of the guide track (Fig. 10). As will be set forth hereinafter, these flanges serve to confine and guide the rollers 48 on the pins 49. It will be noted that the rollers are guided by the guide track through their entire path of movement except from the end of the track indicated at 68 and the beginning of the track at the portion 61 (Fig. 3).

Figure 17:
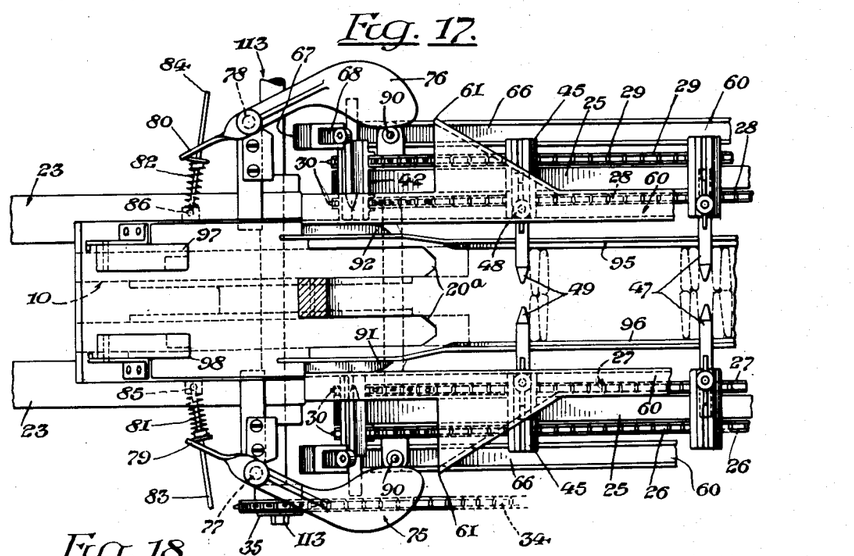
Fig. 17 is a plan view of the mechanism shown in Fig. 15.

A pair of cams 75 and 76 are also provided, pivoted and supported by the pivots 77 and 78, respectively. The rear end of the cams 75 and 76 are each provided with tail portions 79 and 80 urged outwardly by the springs 81 and 82, respectively. The springs 81 and 82 are mounted on the pins 83 and 84. The pins 83 and 84 are pivoted on the frame as indicated at 85 and 86, respectively, and swing inwardly when the cams 75 and 76 are rotated, as shown in Fig. 17.

Figure 15:
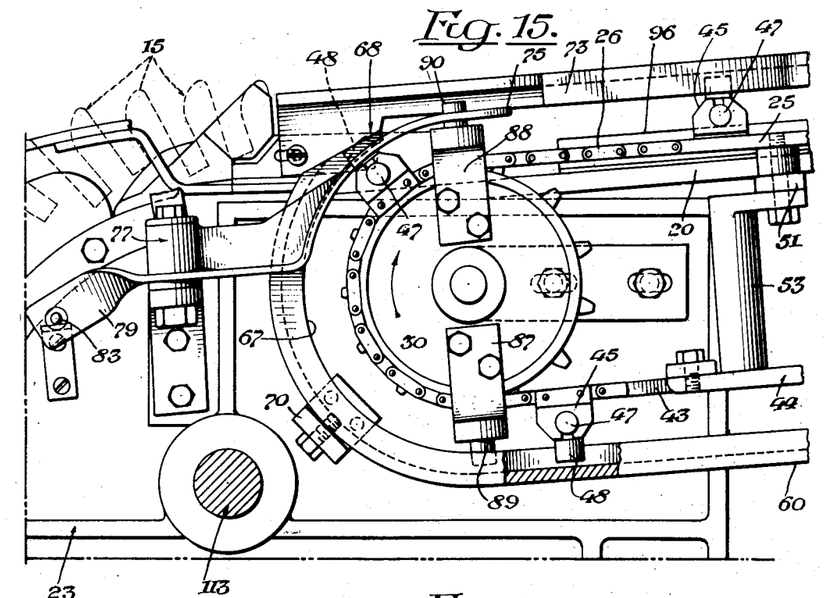
Fig. 15 is a side view of the forward sprocket wheel including roll brackets thereon for controlling the operation of the pin setting cam.
Figure 16:
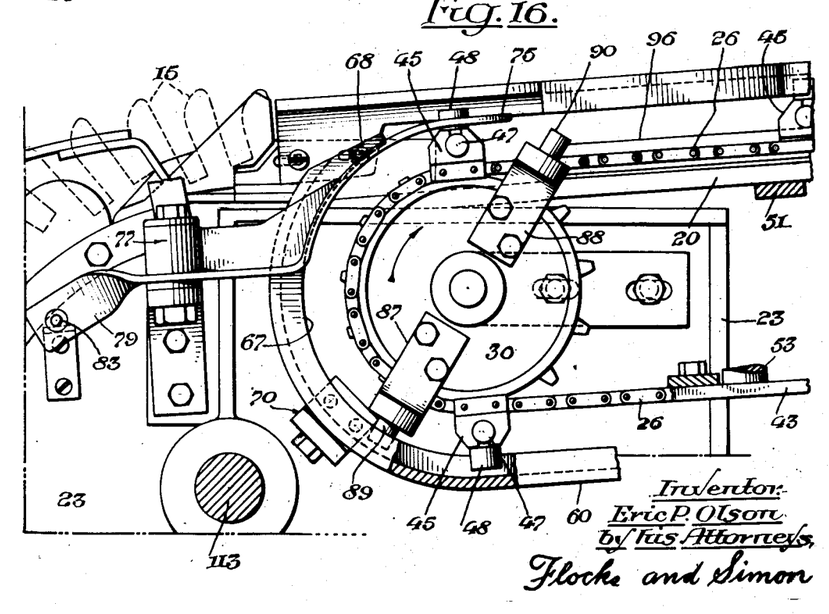
Fig. 16 is a similar view but showing the sprocket and roll bracket partially rotated and the pin setting cams ready to project the adjacent pins transversely of the match books in the trough.
Figure 18:
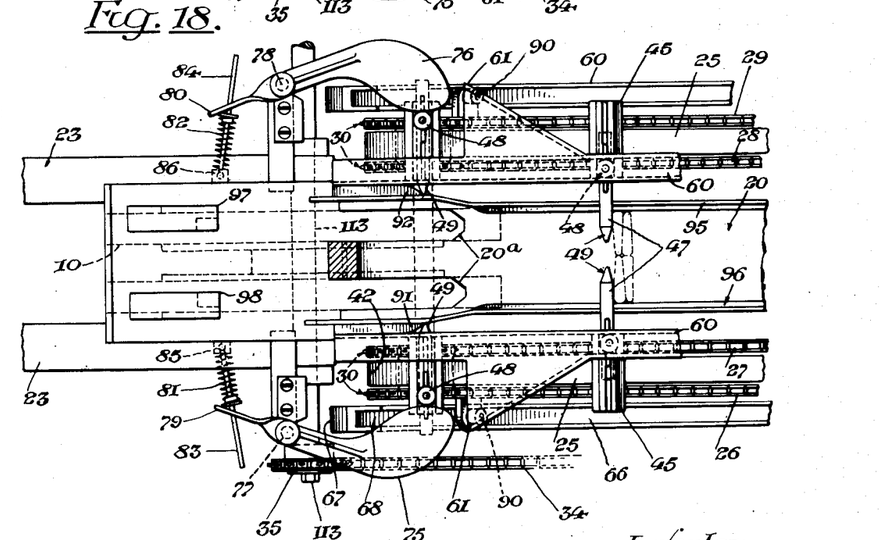
Fig. 18 is a plan view of the mechanism shown in Fig. 16.

As best shown in Figs. 15 and 16, one of the chain sprockets 30 is provided with a pair of arms 87 and 88 rotatable with that sprocket and provided at their outer ends with the rolls 89 and 90, respectively. As shown in Figs. 15 and 17, the rolls 89 and 90 are adapted periodically to move the cams 75 and 76 outwardly. This prevents the face of the cams from engaging the rollers 48 on the pins 49. When, however, the sprocket 30 rotates the arms 87 and 88 away from the cams 75 and 76 these cams are allowed to move inwardly under the influence of the springs 81 and 82 to engage the rollers 48 on successive pins and force the pins inwardly. The movement of the points 49 of the pins 47, however, in an inward direction, is restricted by the cams 91 and 92, as shown in Fig. 18, so that the pins can only be projected between the match books at precisely the correct point. This prevents the engagement of the points 49 of the pins 47 with the teeth 15 of the reversing mechanism. As best shown in Fig. 7, the pin is projected between the books, indicated at 93 and 94, just as the teeth 15 are leaving the space between the books and while the books are still spaced and compressed by the action of the teeth 15. As may be understood, each of the pins 47 is spaced along the corresponding conveyor chains at a distance sufficient to project a pin between successive books from each side thereof so as to separate and segregate a predetermined number of books, as for example, twenty-five, in each of the rows being fed from the reversing mechanism. The trough 20 is provided on each of its sides with angle irons 95 and 96 which serve to retain the match books in a straight line path. The match books are prevented from rising during the projection of the pins thereinbetween as by cover members 97 and 98 suitably supported and spaced from the surface of the trough 20 and the books are supported and withdrawn from the pockets 16 and 17 by the portions 20a extending from the trough 20 between and outside of the wheels 14. It will be noted that the trough 20 has a slight upward inclination and forms a first station for the assembly of inverted carton bottoms with the segregated and separated match books.

Figures 2, 2A:
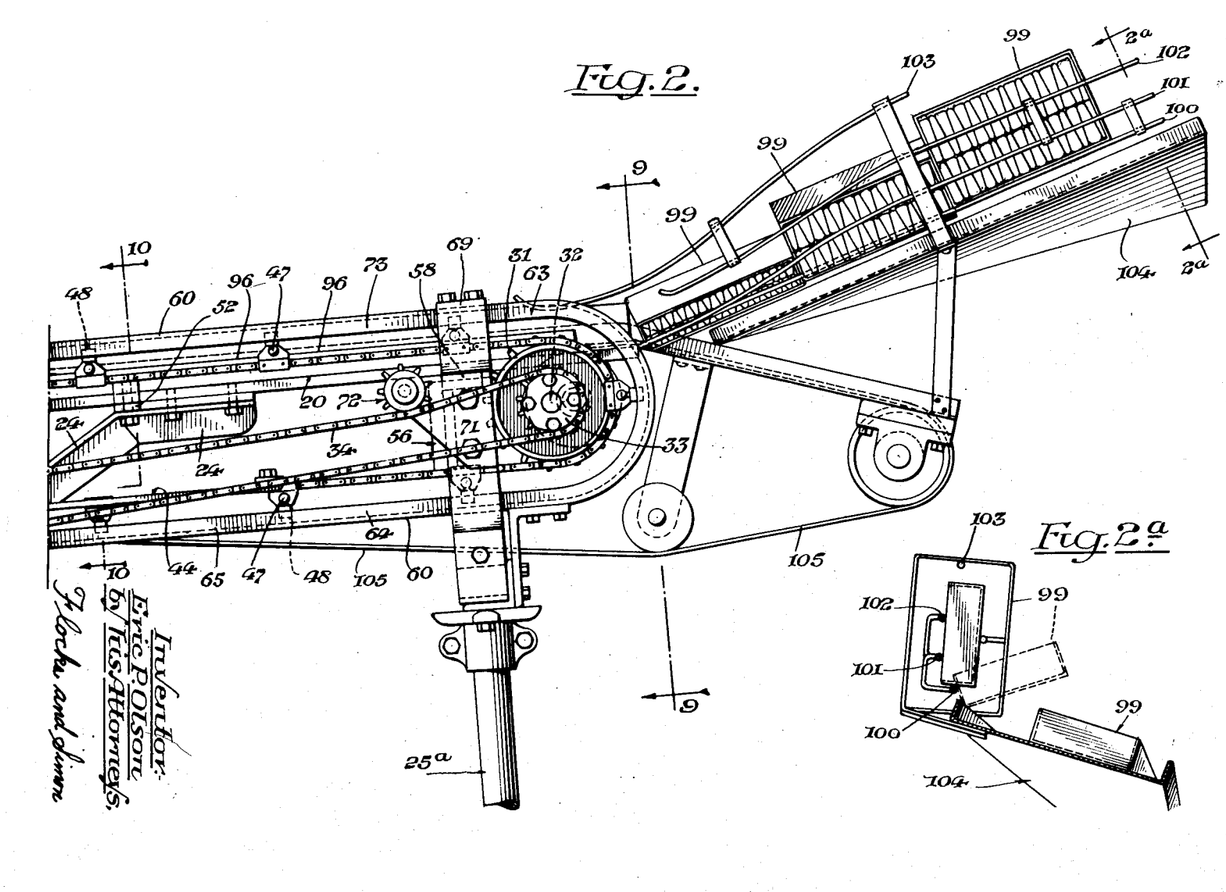
Fig. 2 is a similar view showing the opposite end of this mechanism which includes a chute for receiving the match books in cartons.
Fig. 2a is a transverse section of the chute, as on the line 2a—2a of Fig. 2.

As shown in Fig. 3, the carton 99 is inverted and placed over a segregated group of match books. Thereafter the movement of the pins 47 by their corresponding conveyor chains moves the assembled cartons and books against the trough inclination to the end of the trough. The pins are then withdrawn by the portions 63 of the guide tracks and the inverted cartons and match books enter the wire guides 100, 101, 102 and 103. As soon as the pins 47 are withdrawn the consequent expansion of the match books will retain them within the cartons 99 and, as shown, the bottom wire guides 100, 101 and 102 (Fig. 2) gradually turn to first bring the loaded cartons to a vertical position and then overturn them at the upper end of the wire guides. As the loaded cartons are overturned they are caught by a chute 104 having a sharp downward inclination and feeding to a conveyor belt indicated at 105. The conveyor belt is moved in the direction of the arrow 106 by a drive pulley 107 rotatable with the shaft 108 driven by the sprocket 109. The sprocket 109 is in turn driven by the drive chain 110 trained over the idler sprocket 111 at one end and driven by the sprocket 112 at its other end. The sprocket 112 is mounted on the main shaft 113 of the reversing mechanism, previously described, and rotatable therewith. The shaft 113 is driven through a clutch mechanism, indicated in general at 114, by the sprocket 115 in turn driven by the drive chain 24 from the book match machine. The purpose of the clutch 114 is to prevent any damage and stop both the reversing mechanism and the separating and segregating mechanism if a jam should occur.

The clutch 114 is shown in detail in Figs. 5 and 6. Referring to these figures in particular, it will be noted that the shaft 113 is connected as by a key 117 to a clutch arm 118 provided with projecting pins 119 and 120. The inner ends of the pins 119 and 120 fit into recesses 121 and 122, respectively, in the face of the sprocket 115. Spring-pressed balls 123 and 124 bear against suitable grooves in the pins 119 and 120 to normally retain the ends of the pins within the recesses 121 and 122 so that the sprocket 115 and the sprocket 112 will revolve as a unit. However, if any undue stress or resistance to the driving force of the sprocket 115 prevails, the pins 119 and 120 will be forced out of the recesses 121 and 122 to prevent further drive.

*Operation*

As best shown in Fig. 1, completed match books are received from the conveyor 13, fed into the turret 10 and the covers thereon are tucked by the tucker arm 12. Thereafter the books (Fig. 7) are reversed with each alternate book rotated in the opposite direction 90° by the reversing wheels 14, being received in the radial pockets 16 and 17 separated by the teeth 15. As they are discharged from the pockets to the trough 20, the pins 47 moved by the chains 26, 27, 28 and 29 are projected between the books at intervals, the pins being projected by the cams 75 and 76 from opposite sides of the trough 20. As previously pointed out, the premature action of the cams 75 and 76 is prevented by the rolls 89 and 90, as shown in Fig. 15. In Fig. 16 the roll 90 is shown out of the path of the cam 75. Further, the cams 91 and 92 prevent the projection of the pins into such a position as to contact the teeth 15 on the reversing mechanism. This action of the points 49 of the pins serves to separate and segregate in partially compressed condition a predetermined number of books which are moved by the pins 47 along the trough 20.

At a first station, represented by the trough 20, an inverted carton bottom 99 is placed over the segregated books. The pins are withdrawn from between the assembled books and cartons by the action of the outwardly extending portions 62 of the guide tracks 50 which moves the pins 47 within the sheaths 45. Thereafter the action of the cartons themselves pushes the loaded cartons up the wire guides 100, 101, 102 and 103 to the reversal point or second station where the loaded cartons are inverted and fall on the inclined chute 104. The inclination of the chute feeds the loaded cartons to the conveyor belt 105 which returns them to a third station adjacent the first station. At this point the operator places a top on the cartons.

It will be obvious to those skilled in the art that various changes may be made without departing from the spirit of the invention and therefore the invention is not limited to what is shown in the drawings and described in the specification but only as indicated in the appended claims.

I claim:

1. A book match separating and packaging machine comprising means for feeding a plurality of match books in a substantially continuous stream and in face-to-face, compressed relationship, means adjacent said feeding means for periodically and successively separating said stream into groups and maintaining the match books in each group in compressed relation separated by said separating means from each successive group, means for moving said separating means to move said groups to a first station for assembling a carton with one of said groups, means for moving said separating means to a second station, means at said second station for inverting said assembled group and carton so as to produce a packed carton in normal position and means for moving said packed carton to a third station adjacent said first station to permit assembly of a cover therewith.

2. A book match separating and packaging machine comprising means for feeding a plurality of match books in a substantially continuous stream and in face-to-face relation, said means including pockets for said books, teeth separating said pockets and means for removing said books from said pockets, separating means adjacent said feeding means movable between successive books as they leave said pockets to successively separate said stream into groups, means for moving said separating means between said books and means for moving said separating means to move said groups past a station for assembling a carton with one of said groups.

3. A book match separating and packaging machine comprising means for feeding a plurality of match books in a substantially continuous stream and in face-to-face relation, said means including pockets for said books, teeth separating said pockets and means for removing said books from said pockets, separating means adjacent said feeding means movable between successive books as they leave said pockets to successively separate said stream into groups, means for moving said separating means between successive books, a second station spaced from said first station and means positioned between said stations for moving said separating means from between said books.

4. A book match separating and packaging machine comprising means for feeding a plurality of match books in a substantially continuous stream and in face-to-face relation, said means including pockets for said books and teeth separating said pockets, supporting means for said books adjacent said feeding means for receiving said books and cause the books to leave said pockets, separating means adjacent said feeding means and including pins movable between selected successive books as they leave said pockets to successively separate said stream into groups, means for moving said pins between said books and means for moving said pins to thereby move said groups along said supporting means in spaced relation with said pins therebetween.

5. A book match separating and packaging machine comprising means for feeding a plurality of match books in a substantially continuous stream and in face-to-face relation, said means including pockets for said books and teeth separating said pockets, supporting means for said books adjacent said feeding means to receive said books and cause the books to leave said pockets, separating means adjacent said feeding means and including pins movable between selected successive books as they leave said pockets to successively separate said stream into groups, means for moving said pins between said books, means for moving said pins to move said groups past a station for assembling a carton with one of said groups, guide means adjacent said supporting means cooperating with said pins to maintain said pins between said books at said station and guide means at the end of said station for moving said pins away from said books.

6. A book match separating and packaging machine comprising means for feeding a plurality of match books in a substantially continuous stream and in face-to-face relation, said means including pockets for said books and teeth separating said pockets, supporting means for said books adjacent said feeding means to receive said books and cause the books to leave said pockets, separating means adjacent said feeding means and including pins movable between selected successive books as they leave said pockets to successively separate said stream into groups, means for moving said pins between said books, means for moving said pins to move said groups past a station for assembling a carton with one of said groups, a guide track having a portion generally parallel to said supporting means and cooperating with said pins to maintain said pins between said books at said station and a second portion adjacent the end of said station for moving said pins away from said books.

7. A book match separating and packaging machine comprising means for feeding a plurality of match books in a substantially continuous stream and in face-to-face relation, said means including pockets for said books and teeth separating said pockets, supporting means for said books adjacent said feeding means to receive said books and cause the books to leave said pockets, separating means adjacent said feeding means and including pins movable between selected successive books as they leave said pockets to successively separate said stream into groups, means for moving said pins between said books, means for moving said pins to move said groups past a station for assembling a carton with one of said groups, guide means adjacent said supporting means cooperating with said pins to maintain said pins between said books at said station, guide means at the end of said station for moving said pins away from said books, and means for moving said pins to return the same to a position adjacent said feeding means.

8. A book match separating and packaging machine comprising means for feeding a plurality of match books in a substantially continuous stream and in face-to-face relation, said means including pockets for said books and teeth separating said pockets, supporting means for said books adjacent said feeding means to receive said books and cause the books to leave said pockets, separating means adjacent said feeding means and including pins movable between selected successive books as they leave said pockets to successively separate said stream into groups and spring-operated means for moving said pins between said successive groups, means for moving said pins to move said groups past a station for assembling a carton with one of said groups, guide means adjacent said supporting means cooperating with said pins to maintain said pins between said books at said station and guide means at the end of said station for moving said pins away from said books.

9. In a book match separating and packaging machine, means for feeding a plurality of match books in a substantially continuous stream and in face-to-face relation, said means including pockets for said books and teeth separating said pockets, supporting means for said books adjacent said feeding means to receive said books and cause the books to leave said pockets, pins movable between selected successive books just prior to their leaving said pockets, spring operated cam means for moving said pins and means for preventing premature movement of said pins into contact with said teeth.

10. In a book match separating and packaging machine, means for feeding a plurality of match books in a substantially continuous stream and in face-to-face relation, said means including pockets for said books and teeth separating said pockets, supporting means for said books adjacent said feeding means to receive said books and cause the books to leave said pockets, pins movable between selected successive books just prior to their leaving said pockets to successively separate said stream into groups, spring operated cam means for moving said pins, means for preventing premature movement of said pins into contact with said teeth, means for moving said pins to move said groups and means movable with said last-mentioned means for moving said cam means away from said pins.

11. A process for the packaging of match books comprising feeding said books in a substantially continuous stream in face-to-face relation while compressing the books in said stream, separating said stream into successive groups of books while maintaining the books in each group in compressed condition, each group containing a predetermined number of books, placing a carton over each of said group of books to assemble the same therewith while maintaining the books in each group in compressed condition and each group in separated condition, releasing the pressure on said books so that the expansion thereof will maintain said books within said carton, thereafter inverting assembled carton and books and placing a cover thereon.

12. A process for the packaging of match books comprising feeding said books in a substantially continuous stream in face-to-face relation while compressing the books in said stream, separating said stream into groups while maintaining the books in each group in compressed condition, each of said groups containing a predetermined number of books, moving said groups to a first station while maintaining the books in each group in compressed condition and said groups in separated condition, inverting a carton and placing said carton over one of said groups of books at said first station to assemble the same therewith while maintaining said group in compressed condition, releasing the pressure on the books after assembly with said carton so that the expansion thereof will maintain said books within said carton, moving said assembled carton and books to a second station, inverting said assembled carton and books at said second station, moving said inverted carton and books from said second station to a third station adjacent said first station and placing a cover thereon at said third station.

13. In a book match separating and packaging machine, means for feeding a plurality of match books in a substantially continuous stream in face-to-face relation, said means including pockets for said books and teeth separating said pockets, supporting means for said books adjacent said feeding means to receive said books and cause the books to leave said pockets, pins movable between selected successive books just prior to their leaving said pockets, means for moving said pins and stationary cam members positioned adjacent said supporting means and in a portion of the path of movement of said pins for preventing premature movement of said pins into contact with said teeth.

14. A book match separating and packaging machine comprising means for feeding a plurality of match books in a substantially continuous stream and in face-to-face compressed relationship, separating means adjacent said feeding means for periodically and successively separating said stream into groups and maintaining the match books in each group in separated, compressed relation with said separating means between successive groups, means for moving said separating means between successive groups, means for moving said separating means to move said groups past a station for assembling a carton with one of said groups and means for moving said separating means from between said groups so that said group when assembled with said carton is maintained within said carton under pressure.

15. A book match separating and packaging machine comprising means for feeding a plurality of match books in a substantially continuous stream and in face-to-face compressed relationship, separating means adjacent said feeding means for periodically and successively separating said stream into groups and maintaining the match books in each group in separated, compressed relation with said separating means between successive groups, means for moving said separating means between successive groups, means for moving said separating means to move said groups past a station for assembling a carton with one of said groups, means for moving said separating means from between said groups so that said group when assembled with said carton is maintained within said carton under pressure, and guide means adjacent said last-mentioned means for inverting said assembled carton and group.

16. A book match separating and packaging machine comprising means for feeding a plurality of match books in a substantially continuous stream and in face-to-face compressed relationship, separating means adjacent said feeding means for separating said stream of match books into groups, and means for moving said separating means to move said groups past a station for assembling a carton with one of said groups, said separating means moving with said feeding means and at the same speed thereof.

17. A book match separating and packaging machine comprising means for feeding a plurality of match books in a substantially continuous stream and in face-to-face, compressed relationship, separating means adjacent said feeding means for periodically and successively separating said stream into groups and maintaining the match books in each group in compressed relation separated by said separating means from each successive group, and means for moving said separating means to move said groups past a station for assembling a carton with one of said groups, said separating means moving with said feeding means and at the same speed thereof.

18. A book match separating and packaging machine comprising means for feeding a plurality of match books in a substantially continuous stream and in face-to-face, compressed relationship, means adjacent said feeding means for periodically and successively separating said stream into groups and maintaining the match books in each group in compressed relation separated by said separating means from each successive group, means for moving said separating means to move said groups to a first station for assembling a carton with one of said groups, said separating means moving with said feeding means and at the same speed thereof, means for moving said separating means to a second station, means at said second station for inverting said assembled group and carton so as to produce a packed carton in normal position, and means for moving said packed carton to a third station adjacent said first station to permit assembly of a cover therewith.

19. A book match separating and packaging machine comprising means for feeding a plurality of match books in a substantially continuous stream, separating means moving with and at the same speed as said feeding means for periodically and successively separating said stream into groups and maintaining the match books in each group separated by said separating means from each successive group, and means for moving said separating means to move said groups past a station for assembling a carton with one of said groups.

ERIC P. OLSON.

References Cited in the file of this patent

UNITED STATES PATENTS

| Number | Name | Date |
|---|---|---|
| 1,042,472 | Paridon et al. | Oct. 29, 1912 |
| 1,132,309 | Donnelly | Mar. 16, 1915 |
| 1,243,404 | Hawthorne | Oct. 16, 1917 |
| 1,789,253 | Parker | Jan. 13, 1931 |
| 2,195,197 | Wright | Mar. 26, 1940 |
| 2,222,026 | Gill | Nov. 19, 1940 |